US012592081B2

(12) United States Patent
Kurehashi

(10) Patent No.: US 12,592,081 B2
(45) Date of Patent: Mar. 31, 2026

(54) ASSISTANCE CONTROLLING APPARATUS, ASSISTANCE CONTROLLING METHOD, AND COMPUTER-READABLE STORAGE MEDIUM

(71) Applicant: HONDA MOTOR CO., LTD., Tokyo (JP)

(72) Inventor: Takahiro Kurehashi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/788,190

(22) Filed: Jul. 30, 2024

(65) Prior Publication Data

US 2025/0046094 A1 Feb. 6, 2025

(30) Foreign Application Priority Data

Jul. 31, 2023 (JP) ................................. 2023-124682

(51) Int. Cl.
| | |
|---|---|
| *G06V 20/54* | (2022.01) |
| *G06T 7/70* | (2017.01) |
| *G06T 7/90* | (2017.01) |
| *H04W 4/029* | (2018.01) |

(52) U.S. Cl.
CPC ................ *G06V 20/54* (2022.01); *G06T 7/70* (2017.01); *G06T 7/90* (2017.01); *H04W 4/029* (2018.02); *G06V 2201/08* (2022.01)

(58) Field of Classification Search
CPC ...................................................... G06V 20/54
USPC ......................................................... 348/149
See application file for complete search history.

(56) References Cited

U.S. PATENT DOCUMENTS

2018/0211116 A1* 7/2018 Modi .................. G06F 16/7867

FOREIGN PATENT DOCUMENTS

| JP | 2007241729 A | 9/2007 |
|---|---|---|
| WO | 2019188429 A1 | 10/2019 |

* cited by examiner

*Primary Examiner* — Amir Shahnami

(57) ABSTRACT

An assistance controlling apparatus includes: a first acquiring unit which acquires identification information and location information of a user terminal associated with a user; a second acquiring unit which acquires recognition information and location information of a moving object acquired by analyzing an image of the moving object acquired by an image capturing apparatus; a storage controlling unit which performs control for storing the recognition information of the moving object in association with the identification information of the user terminal when the location information of the user terminal and the location information of the moving object match; and an assistance controlling unit which performs control related to assistance for a traffic participant based on the identification information of the user terminal and the recognition information of the moving object that are stored in association with each other under the control of the storage controlling unit.

20 Claims, 10 Drawing Sheets

| TERMINAL ID | TIME | COLOR | TYPE | SIZE | TRAVELING CHARACTERISTIC |
|:---:|:---:|:---:|:---:|:---:|:---:|
| 101 | TIME 1 | COLOR 1 | TYPE 1 | SIZE 1 | TRAVELING CHARACTERISTIC 2 |
| 102 | TIME 2 | COLOR 2 | TYPE 2 | SIZE 2 | TRAVELING CHARACTERISTIC 3 |

*FIG.3*

| TERMINAL ID | TIME | COLOR | AGE | HEIGHT | WALKING CHARACTERISTIC |
|---|---|---|---|---|---|
| 103 | TIME 3 | COLOR 3 | AGE 3 | HEIGHT 3 | WALKING CHARACTERISTIC 1 |
| 104 | TIME 4 | COLOR 4 | AGE 4 | HEIGHT 4 | WALKING CHARACTERISTIC 2 |

*FIG.4*

ASSISTANCE CONTROLLING APPARATUS, ASSISTANCE CONTROLLING METHOD, AND COMPUTER-READABLE STORAGE MEDIUM

The contents of the following patent applications are incorporated herein by reference: NO. 2023-124682 filed in JP on Jul. 31, 2023.

BACKGROUND

1. Technical Field

The present invention relates to an assistance controlling apparatus, an assistance controlling method, and a computer-readable storage medium.

2. Related Art

In recent years, efforts have been intensified to provide access to a sustainable transportation system with consideration given to even vulnerable people among other traffic participants. To realize this, research and development have been focused on to further improve traffic safety and convenience through research and development related to preventive safety technology. Patent Documents 1 to 2 describe technologies related to adding of an attribute to a vehicle or a driver.

PRIOR ART DOCUMENTS

Patent Documents

Patent Document 1: International Publication No. 2019/188429
Patent Document 2: Japanese Patent Application Publication No. 2007-241729.

BRIEF DESCRIPTION OF THE DRAWINGS

FIG. 3 illustrates an example of a data structure of attribute information of a vehicle, including recognition information and movement characteristic information that are stored under control of a storage controlling unit 240.
FIG. 4 illustrates an example of a data structure of attribute information of a user, including recognition information and movement characteristic information that are stored under the control of the storage controlling unit 240.

DESCRIPTION OF EXEMPLARY EMBODIMENTS

Hereinafter, embodiments of the present invention will be described. However, the following embodiments are not for limiting the invention according to the claims. In addition, not all of the combinations of features described in the embodiments are essential to the solution of the invention.

Figure 1:
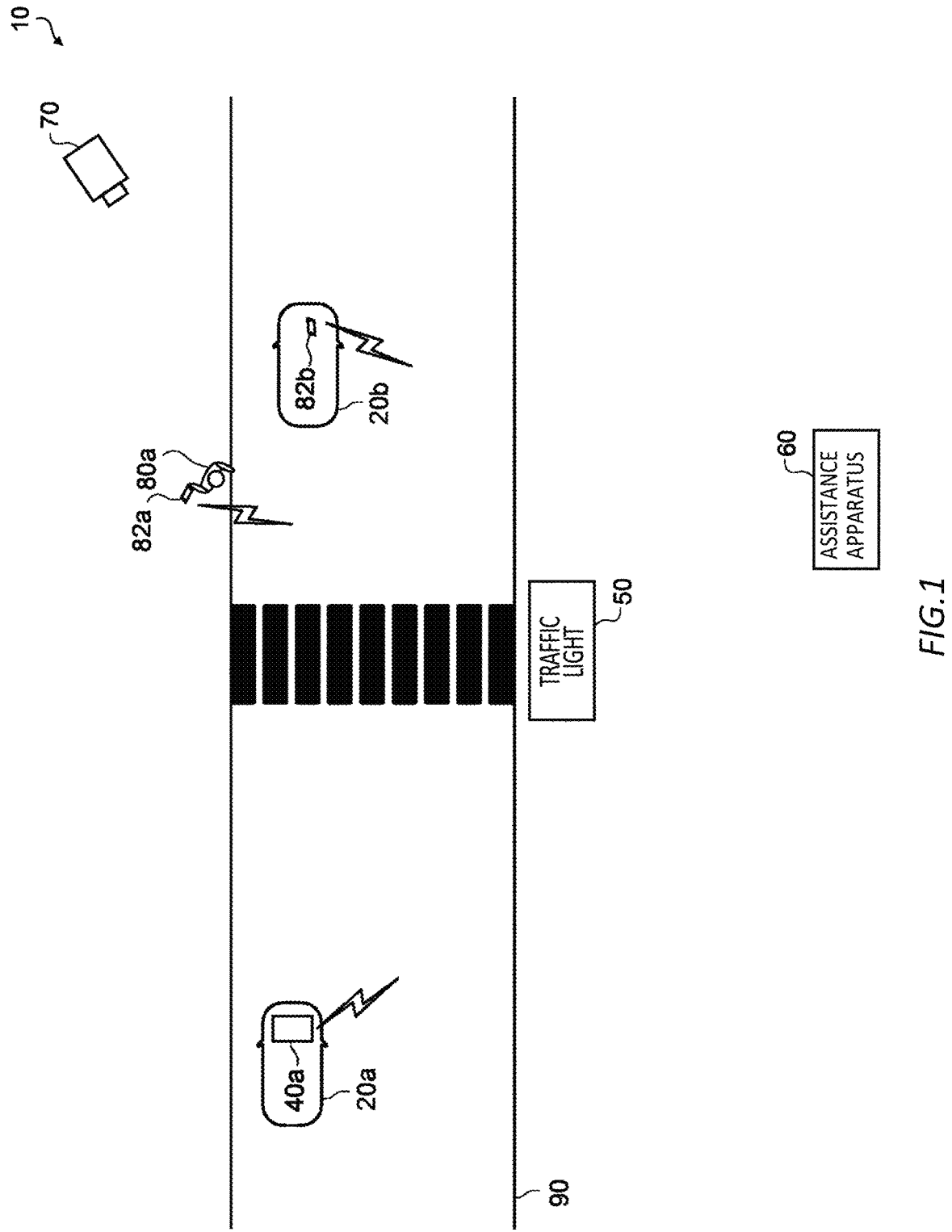
FIG. 1 schematically illustrates a usage scene of an assistance system 10.

FIG. 1 schematically illustrates a usage scene of an assistance system 10. The assistance system 10 includes an assistance apparatus 60, an image capturing apparatus 70, and a traffic light 50.

In FIG. 1, a user 80a, a vehicle 20a, and a vehicle 20b are traffic participants. The vehicle 20a includes an in-vehicle processing apparatus 40a. A user terminal 82b is a user terminal carried by an occupant of the vehicle 20b. A user terminal 82a is a terminal carried by the user 80a. In this embodiment, the user 80a is a pedestrian. The user 80a is an example of a moving object.

In this embodiment, the user terminal 82a and the user terminal 82b may be collectively referred to as a "user terminal 82."

The user 80a and the user 80b may be collectively referred to as a "user 80."

The vehicle 20a travels on a road 90. The vehicle 20a is an example of the moving object. The in-vehicle processing apparatus 40a includes various sensors such as a location sensor including a Global Navigation Satellite System (GNSS) receiver, a speed sensor such as a wheel speed sensor, and an image capturing apparatus which captures an image of surroundings of the vehicle 20a. The in-vehicle processing apparatus 40a includes a feature for processing of information acquired by the various sensors equipped in the in-vehicle processing apparatus 40a and a feature for communication with the assistance apparatus 60. The in-vehicle processing apparatus 40a provides an advanced driver-assistance system (ADAS) feature equipped in the vehicle 20a.

For example, the user terminal 82a and the user terminal 82b are mobile terminals such as smartphones. Each of the user terminal 82a and the user terminal 82b periodically transmits current location information of each of the user terminals detected by the location sensor including the GNSS receiver to the assistance apparatus 60 together with identification information of each of the user terminal 82a and the user terminal 82b.

The image capturing apparatus 70 is fixed on a transportation infrastructure. The image capturing apparatus 70 acquires, by analyzing a captured image, locations of the vehicle 20a, the vehicle 20b, and the user 80a that exist within an image-capturing range of the image capturing apparatus 70, and transmits the acquired locations of the vehicle 20a, the vehicle 20b, and the user 80a to the assistance apparatus 60.

The assistance apparatus 60 receives, by mobile communication, the information transmitted from the in-vehicle processing apparatus 40a, the user terminal 82a, and the image capturing apparatus 70. The assistance apparatus 60 may receive, through the mobile communication as well as a communication line such as the Internet and a dedicated line, the information transmitted from the in-vehicle processing apparatus 40a, the user terminal 82a, and the image capturing apparatus 70.

The image capturing apparatus 70 identifies locations of the vehicle 20b and the user 80a by analyzing the image captured by the image capturing apparatus 70. The image capturing apparatus 70 further acquires a color, a size and a type of the vehicle 20b by analyzing the image captured by the image capturing apparatus 70. The color, the size, and the type are examples of recognition information of the vehicle 20b. The recognition information is, for example, visually recognizable information of the vehicle 20b. The image capturing apparatus 70 further acquires a color of clothing, an age, and a height of the user 80a by analyzing the image captured by the image capturing apparatus 70. The color of clothing, the age, and the height are examples of recognition information of the user 80a. The recognition information is, for example, visually recognizable information of the user 80a.

The image capturing apparatus 70 further acquires traveling characteristic information of the vehicle 20b by analyzing the image captured by the image capturing apparatus 70. The traveling characteristic information includes information indicating whether the vehicle 20b has a tendency toward unsafe driving. For example, the image capturing apparatus 70 identifies an indication status of a traffic signal of the traffic light 50 and, when it is detected from the image that the vehicle 20b is traveling without regard to the traffic signal, determines that the vehicle 20b has a tendency toward unsafe driving. The image capturing apparatus 70 determines that the vehicle 20b has a tendency toward unsafe driving when it turns left or right without operating a turn signal of the vehicle 20b. In this manner, the image capturing apparatus 70 determines that the vehicle 20b has a tendency toward unsafe driving when it is traveling without following traffic rules. In another case, the image capturing apparatus 70 determines that the vehicle 20b has a tendency toward unsafe driving when it turns left or right without regard to an oncoming vehicle, a vehicle behind, and/or a pedestrian in a vicinity. The traveling characteristic information is an example of movement characteristic information of the vehicle 20b.

The image capturing apparatus 70 further acquires walking characteristic information of the user 80a by analyzing the image captured by the image capturing apparatus 70. The traveling characteristic information is information indicating a behavior tendency of the user 80a when he/she passes the road. For example, the image capturing apparatus 70 identifies the indication status of the traffic signal of the traffic light 50 and, when it is detected from a history of the location information of the user 80a from the image that the user 80a is crossing the road 90 without following the traffic signal, determines that the user 80a has a tendency to cross the road 90 without following the indication status of the traffic light 50. The image capturing apparatus 70 recognizes a road marking and/or a traffic sign on the road 90 and, when it is detected from the history of the location information of the user 80a from the image that the user 80a is passing without following the road marking and/or the traffic sign, determines that the user 80a has a tendency to pass without following the road marking and/or the traffic sign. For example, the image capturing apparatus 70 determines whether the pedestrian has a tendency to cross the road at a location where no crosswalk is provided. Further, the image capturing apparatus 70 determines whether the user 80a has a tendency to cross the road 90 at a location where no crosswalk is provided in a vicinity of a crosswalk. For example, the image capturing apparatus 70 determines whether the user 80a has a tendency to diagonally cross the road 90 in the vicinity of the crosswalk. In another case, the image capturing apparatus 70 determines whether the user 80a has a tendency to start to cross the road in a shorter time than a predetermined time when the indication status of the traffic light 50 switches from a proceed indication to a stop indication. In this manner, the image capturing apparatus 70 determines that the user 80a has a tendency to perform unsafe behavior, when he/she walks without following traffic rules. The walking characteristic information is an example of the movement characteristic information of the user 80a.

The location information of the vehicle 20b and the user 80a, the recognition information of the vehicle 20b and the user 80a, the traveling characteristic information of the vehicle 20b, and the walking characteristic information of the user 80a, which are acquired by the image capturing apparatus 70, are transmitted from the image capturing apparatus 70 to the assistance apparatus 60. The in-vehicle processing apparatus 40a may acquire the location information of the vehicle 20b and the user 80a, the recognition information of the vehicle 20b and the user 80a, the traveling characteristic information of the vehicle 20b, and the walking characteristic information of the user 80a from the image captured by the image capturing apparatus equipped in the in-vehicle processing apparatus 40a, and transmit the acquired information to the assistance apparatus 60.

The assistance apparatus 60 performs matching based on a similarity of locations and displacements by comparing a history of the location information acquired from the image capturing apparatus 70 and/or the in-vehicle processing apparatus 40a with a history of the location information acquired from the user terminal 82a, and extracts recognition information and walking characteristic information of the user terminal 82a among the recognition information and the walking characteristic information acquired from the image capturing apparatus 70 and/or the in-vehicle processing apparatus 40a. The assistance apparatus 60 stores the extracted recognition information and walking characteristic information of the user terminal 82a and the identification information received from the user terminal 82a in association with each other.

The assistance apparatus 60 performs matching based on the similarity of locations and displacements by comparing the history of the location information acquired from the image capturing apparatus 70 and/or the in-vehicle processing apparatus 40a with a history of the location information acquired from the user terminal 82b, and extracts recognition information and traveling characteristic information of the vehicle 20b among the recognition information and the walking characteristic information acquired from the image capturing apparatus 70 and/or the in-vehicle processing apparatus 40a. The assistance apparatus 60 stores the extracted recognition information and traveling characteristic information of the vehicle 20b and the identification information received from the user terminal 82b in association with each other.

In this manner, the assistance apparatus 60 can associate the identification information of the user terminal 82b with the recognition information and the traveling characteristic information of the vehicle 20b. Thus, when the vehicle 20b is traveling in a location where no image capturing apparatus 70 is provided or a location where no other vehicle having an ADAS feature exists in surroundings, the assistance apparatus 60 can perform assistance for a traffic participant based on the recognition information and the traveling characteristic information when it receives the identification information of the user terminal 82*b*. For example, when the vehicle 20*b* is red and has a tendency toward unsafe driving, the assistance apparatus 60 can warn the user of the user terminal in surroundings of the vehicle 20*b* by outputting, e.g. vocally, warning information notifying that "Please be aware of the approaching red vehicle" to the user terminal in the surroundings of the vehicle 20*b*.

Similarly, the assistance apparatus 60 can associate the identification information of the user terminal 82*a* with the recognition information and the walking characteristic information of the user 80*a*. Thus, when the user 80*a* is walking in a location where no image capturing apparatus 70 is provided or a location where no other vehicle having an ADAS feature exists in surroundings, the assistance apparatus 60 can perform assistance for a traffic participant based on the recognition information and the traveling characteristic information when it receives the identification information of the user terminal 82*b*. For example, when the user 80*a* is dressed in red and has a tendency to cross a road without regard to a road marking or a traffic sign, the assistance apparatus 60 can warn an occupant of a vehicle in surroundings of the user 80*a* by outputting warning information notifying that "Please be aware of the pedestrian dressed in red in your vicinity" to the vehicle in the surroundings of the user 80*a*.

Figure 2:
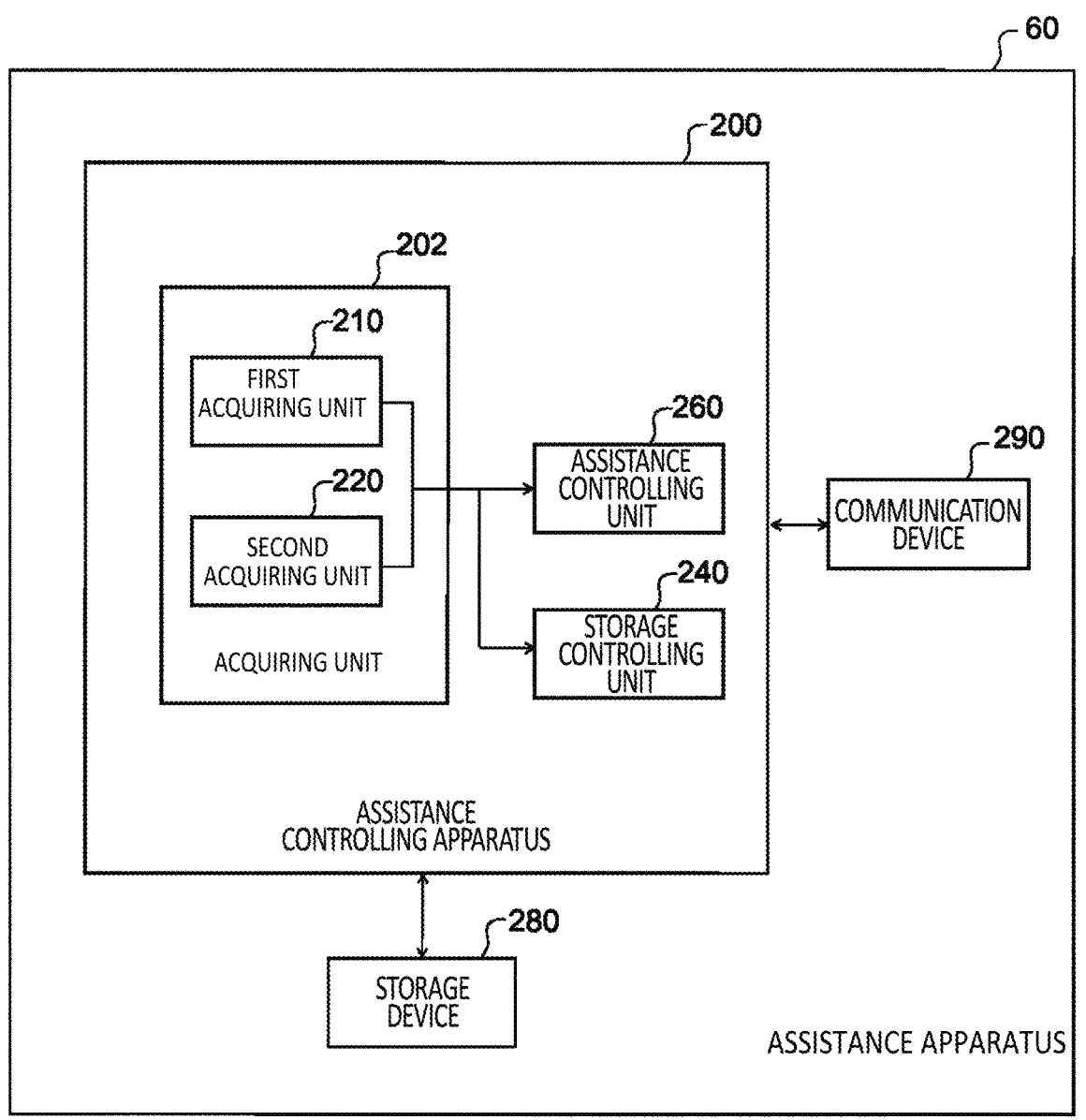
FIG. 2 illustrates a functional configuration of an assistance apparatus 60.

FIG. 2 illustrates a functional configuration of the assistance apparatus 60. The assistance apparatus 60 includes an assistance controlling apparatus 200, a communication apparatus 290, and a storage device 280.

The communication apparatus 290 provides for communication between each of the in-vehicle processing apparatus 40*a*, the user terminal such as the user terminal 82*a* and the user terminal 82*b*, and the image capturing apparatus 70, and the assistance apparatus 60, based on the control of the assistance controlling apparatus 200. For example, the assistance controlling apparatus 200 includes a circuit such as an arithmetic processing unit including a processor. The assistance controlling apparatus 200 may be implemented by a microcomputer including a CPU, a ROM, a RAM, an I/O and a bus, and the like. The storage device 280 includes a non-volatile storage medium. The assistance controlling apparatus 200 performs processing by using information stored in the storage device 280. The storage device 280 may store information related to traffic such as map information used for the control by the assistance controlling apparatus 200.

The assistance controlling apparatus 200 includes an acquiring unit 202, a storage controlling unit 240, and an assistance controlling unit 260. The acquiring unit 202 includes a first acquiring unit 210 and a second acquiring unit 220. Note that an aspect may be employed in which the assistance apparatus 60 does not have some features in the functional configuration illustrated in FIG. 2.

The first acquiring unit 210 acquires the identification information and the location information of the user terminal 82 associated with the user 80. The first acquiring unit 210 acquires the identification information and the location information of the user terminal 82 that are transmitted from the user terminal 82 and received by the communication apparatus 290.

The second acquiring unit 220 acquires recognition information and location information of a moving object acquired by analyzing an image of the moving object acquired by an image capturing apparatus. Here, the image capturing apparatus is the image capturing apparatus 70 or the image capturing apparatus equipped in the in-vehicle processing apparatus 40*a*. The second acquiring unit 220 acquires the recognition information and the location information of the moving object acquired by the image capturing apparatus 70 or the image capturing apparatus equipped in the in-vehicle processing apparatus 40*a*.

When the location information of the user terminal 82 acquired by the first acquiring unit 210 and the location information of the moving object acquired by the second acquiring unit 220 match, the storage controlling unit 240 performs control for storing the recognition information of the moving object acquired by the second acquiring unit 220 in association with the identification information of the user terminal 82 acquired by the first acquiring unit 210. For example, when a matching degree between the location information of the user terminal 82 and the location information of the moving object is higher than a predetermined value, the storage controlling unit 240 performs control for storing the recognition information of the moving object in association with the identification information of the user terminal 82. For example, the storage controlling unit 240 controls the recognition information of the moving object in association with the identification information of the user terminal 82 to be stored in the storage device 280.

The assistance controlling unit 260 performs control related to assistance for a traffic participant based on the identification information of the user terminal 82 and the recognition information of the moving object that are stored in association with each other under the control of the storage controlling unit 240. For example, even if the second acquiring unit 220 cannot acquire the recognition information of the moving object, when the first acquiring unit 210 acquires the identification information of the user terminal 82, the assistance controlling unit 260 performs assistance for a traffic participant based on the identification information of the user terminal 82 and the recognition information of the moving object that are stored in association with each other under the control of the storage controlling unit 240. As an example, the assistance controlling unit 260 performs control for informing the traffic participant other than the user 80 of the recognition information.

The recognition information may include information indicating a color of the moving object. The recognition information may include information indicating a type of the moving object. The recognition information may include information indicating a size of the moving object.

Each time a predetermined time has elapsed, the storage controlling unit 240 may perform control for deleting the identification information of the user terminal 82 and the recognition information of the moving object that are stored in association with each other.

When location information of the user terminal 82 newly acquired by the first acquiring unit 210 and location information of the moving object newly acquired by the second acquiring unit 220 match, the storage controlling unit 240 may perform control for updating the identification information of the user terminal 82 and the recognition information of the moving object that are stored in association with each other.

The second acquiring unit 220 acquires movement characteristic information of the moving object and location information of the moving object acquired by analyzing an image of the moving object acquired by an image capturing apparatus. Here, the image capturing apparatus is the image capturing apparatus 70 or the image capturing apparatus equipped in the in-vehicle processing apparatus 40*a*. The second acquiring unit 220 acquires the movement characteristic information and the location information of the moving object acquired by the image capturing apparatus 70 or the image capturing apparatus equipped in the in-vehicle processing apparatus 40a.

When the location information of the user terminal 82 acquired by the first acquiring unit 210 and the location information of the moving object acquired by the second acquiring unit 220 match, the storage controlling unit 240 performs control for storing the movement characteristic information of the moving object acquired by the second acquiring unit 220 in association with the identification information of the user terminal 82 acquired by the first acquiring unit 210. For example, when a matching degree between the location information of the user terminal 82 and the location information of the moving object is higher than a predetermined value, the storage controlling unit 240 performs control for storing the movement characteristic information of the moving object in association with the identification information of the user terminal 82. For example, the storage controlling unit 240 controls the movement characteristic information of the moving object in association with the identification information of the user terminal 82 to be stored in the storage device 280.

The assistance controlling unit 260 performs control related to assistance for a traffic participant based on the identification information of the user terminal 82 and the movement characteristic information of the moving object that are stored in association with each other under the control of the storage controlling unit 240. For example, even if the second acquiring unit 220 cannot acquire the movement characteristic information of the moving object, when the first acquiring unit 210 acquires the identification information of the user terminal 82, the assistance controlling unit 260 performs assistance for a traffic participant based on the identification information of the user terminal 82 and the movement characteristic information of the moving object that are stored in association with each other under the control of the storage controlling unit 240. As an example, the assistance controlling unit 260 performs control for informing the traffic participant other than the user 80 of the movement characteristic information of the moving object.

When location information of the user terminal 82 newly acquired by the first acquiring unit 210 and location information of the moving object newly acquired by the second acquiring unit 220 match, the storage controlling unit 240 may perform control for updating the identification information of the user terminal 82 and the movement characteristic information of the moving object that are stored in association with each other.

Each time a predetermined time has elapsed, the storage controlling unit 240 may perform control for deleting the identification information of the user terminal 82 and the movement characteristic information of the moving object that are stored in association with each other.

The moving object includes at least one of a pedestrian or a vehicle. In this embodiment, the moving object is the user 80a and/or the vehicle 20b.

When the moving object is a pedestrian, the movement characteristic information may include information indicating a behavior tendency related to passage of a road by the pedestrian. The movement characteristic information may include information indicating whether the pedestrian has a tendency to cross the road at a location where no crosswalk is provided. The movement characteristic information may include information indicating whether the pedestrian has a tendency to cross the road at a location where no crosswalk is provided in a vicinity of a crosswalk. The movement characteristic information may include information indicating whether the pedestrian has a tendency to cross the road without following an indication status of a traffic light. The movement characteristic information may include information indicating whether the pedestrian has a tendency to start to cross the road in a shorter time than a predetermined time when an indication of the traffic light switches from a proceed indication to a stop indication.

When the moving object is a vehicle, the movement characteristic information may include information related to unsafe driving of the vehicle.

The second acquiring unit 220 may acquire movement characteristic information of the moving object and location information of the moving object acquired by analyzing an image of the moving object acquired by the image capturing apparatus.

When the location information of the user terminal 82 acquired by the first acquiring unit 210 and the location information of the moving object acquired by the second acquiring unit 220 match, the storage controlling unit 240 may perform control for storing the recognition information and the movement characteristic information of the moving object that are acquired by the second acquiring unit 220 in association with the identification information of the user terminal 82 acquired by the first acquiring unit 210. The assistance controlling unit 260 may perform control related to assistance for a traffic participant based on the identification information of the user terminal 82 and the recognition information and the movement characteristic information of the moving object that are stored in association with each other under the control of the storage controlling unit 240.

When the moving object is a pedestrian, the recognition information includes information indicating a color of the pedestrian and the movement characteristic information may include information indicating a behavior tendency related to passage of a road by the pedestrian.

When the moving object is a vehicle, the recognition information includes information indicating a color of the vehicle and the movement characteristic information may include information related to unsafe driving of the vehicle.

FIG. 3 illustrates an example of a data structure of attribute information of a vehicle, including recognition information and movement characteristic information that are stored under the control of a storage controlling unit 240. The attribute information of the vehicle includes a terminal ID, time, a color, a type, a size, and a traveling characteristic.

The terminal ID is identification information of the user terminal 82 stored in association with the vehicle. The time, the color, the type, and the size are examples of the recognition information of the vehicle. The traveling characteristic is an example of the movement characteristic information of the vehicle.

The time may be time when information including the terminal ID, the time, the color, the type, the size, and the traveling characteristic is stored in the storage device 280.

The color may be information indicating a representative color recognized from the vehicle. The color may be information indicating a color of a body of the vehicle. The type may be information indicating a car model, may be information indicating a distinction between a truck, a bus, and a passenger car, or may be information indicating a distinction between a standard-sized car, a large-sized car, and the like. The size may be information indicating a length of the vehicle. The size may be information indicating a height of the vehicle, a width of the vehicle, or the like.

In this embodiment, the storage controlling unit 240 associates the user terminal 82*b* and the vehicle 20*b* with each other by performing matching of the location information of the user terminal 82*b* and the location information of the vehicle 20*b* obtained from the image analysis and stores the identification information of the user terminal 82*b* and the color, the type, the size, and the traveling characteristic of the vehicle 20*b* in association with each other as attribute information in the storage device 280.

The traveling characteristic includes information indicating whether the vehicle 20*b* has a tendency toward unsafe driving. The traveling characteristic may include a plurality of data items as data items related to the unsafe driving. The traveling characteristic may include a plurality of data items related to observance of rules and safety, such as not following a traffic light, disregarding a pedestrian crossing a road, making no operation of a turn signal when turning left or right, disregarding an oncoming vehicle when turning left or right, disregarding a pedestrian when turning left or right, disregarding a following car when turning left or right, braking suddenly when turning left or right, or the like.

The recognition information of the vehicle 20*b* may be transmitted from each of the image capturing apparatus 70 and the in-vehicle processing apparatus 40*a*. In addition, the recognition information of the vehicle 20*b* may be transmitted from another image capturing apparatus installed on a transportation infrastructure at another location. Further, the recognition information of the vehicle 20*b* may be transmitted also from an image capturing apparatus of another vehicle at another location. Therefore, there may be a difference between recognition results regarding the color, the type, and the size from respective image capturing apparatuses.

Hence, the storage controlling unit 240 may update the recognition information stored associated with a particular terminal ID, each time it acquires new recognition information of the vehicle associated with the particular terminal ID. The storage controlling unit 240 may update the recognition information associated with the particular terminal ID to latest recognition information. When a plurality of image capturing apparatuses recognize different colors, the storage controlling unit 240 may update the color associated with the particular terminal ID to a color recognized by a majority of the image capturing apparatuses. Similarly, when the plurality of image capturing apparatuses recognize different types, the storage controlling unit 240 may update the type associated with the particular terminal ID to a type recognized by a majority of the image capturing apparatuses.

When the plurality of image capturing apparatuses recognize different sizes, the storage controlling unit 240 may update the size associated with the particular terminal ID to an average value of the sizes recognized by the plurality of image capturing apparatuses. When the plurality of image capturing apparatuses recognize different sizes, the storage controlling unit 240 may update the size associated with the particular terminal ID to a maximum value of the sizes recognized by the plurality of image capturing apparatuses.

When the user terminal 82*b* can be carried by the user, the user terminal 82*b* is not necessarily always mounted on the vehicle 20*b*. Therefore, the storage controlling unit 240 may delete the attribute information depending on time elapsed since the time included in the attribute information. For example, the storage controlling unit 240 deletes the attribute information when a predetermined time has elapsed since the time included in the attribute information. As an example, the storage controlling unit 240 deletes the attribute information when 24 hours or more have elapsed since the time included in the attribute information.

FIG. 4 illustrates an example of a data structure of attribute information of a user, including recognition information and movement characteristic information that are stored under the control of the storage controlling unit 240. The attribute information of the user includes a terminal ID, time, a color, an age, a height, and a walking characteristic.

The terminal ID is identification information of the user terminal 82 stored in association with the user. The time, the color, the age, and the height are examples of the recognition information of the vehicle. The walking characteristic is an example of the movement characteristic information of the user.

The time may be time when the attribute information is stored in the storage device 280.

The color may be information indicating a representative color recognized from the user. The color may be information indicating a color of wear of the user, such as clothing that the user is wearing. The age may be information indicating an age group of the user. The age may be information indicating an estimated age group of the user recognized from the image. The age may be information indicating an age group of the user that is registered in advance in the user terminal identified by the terminal ID. The height may be information indicating a height of the user.

In this embodiment, the storage controlling unit 240 associates the user terminal 82*a* and the user 80*a* with each other by performing matching between the location information of the user terminal 82*a* and the location information of the user 80*a* obtained from the image analysis and stores the identification information of the user terminal 82*a* and the color, the age, the height, and the walking characteristic in association with each other as the attribute information in the storage device 280.

The walking characteristic is information indicating a behavior tendency of the user 80*a* when he/she passes a road. The walking characteristic may include a plurality of data items as data items related to the behavior tendency. The walking characteristic may include a plurality of data items related to observance of rules or safety, such as whether the user 80*a* has a tendency to cross a road without following an indication status of a traffic light, whether the user 80*a* has a tendency to pass a road without following a road marking and/or a traffic sign, whether the pedestrian has a tendency to cross a road at a location where no crosswalk is provided, whether the user 80*a* has a tendency to cross a road at a location where no crosswalk is provided in a vicinity of a crosswalk, whether the user 80*a* has a tendency to diagonally cross a road in a vicinity of a crosswalk, whether the user 80*a* has a tendency to suddenly start to cross a road when an indication status of a traffic light switches from a proceed indication to a stop indication, or the like.

The recognition information of the user 80*a* may be transmitted from each of the image capturing apparatus 70 and the in-vehicle processing apparatus 40*a*. In addition, the recognition information of the user 80*a* may be transmitted from another image capturing apparatus installed on a transportation infrastructure at another location. Further, the recognition information of the user 80*a* may be transmitted also from an image capturing apparatus of another vehicle at another location. Therefore, there may be a difference between recognition results regarding the color, the age, and the height from respective image capturing apparatuses.

Hence, the storage controlling unit 240 may update the recognition information stored associated with a particular terminal ID, each time it acquires new recognition information of the user associated with the particular terminal ID. The storage controlling unit 240 may update the recognition information associated with the particular terminal ID to latest recognition information. When a plurality of image capturing apparatuses recognize different colors, the storage controlling unit 240 may update the color associated with the particular terminal ID to a color recognized by a majority of the image capturing apparatuses.

When the plurality of image capturing apparatuses recognize different ages, the storage controlling unit 240 may update the age associated with the particular terminal ID to an average value of the ages recognized by the plurality of image capturing apparatuses. When the plurality of image capturing apparatuses recognize different ages, the storage controlling unit 240 may update the age associated with the particular terminal ID to a maximum value of the ages recognized by the plurality of image capturing apparatuses. Similarly, when the plurality of image capturing apparatuses recognize different heights, the storage controlling unit 240 may update the height associated with the particular terminal ID to an average value of the heights recognized by the plurality of image capturing apparatuses. When the plurality of image capturing apparatuses recognize different heights, the storage controlling unit 240 may update the height associated with the particular terminal ID to a maximum value of the heights recognized by the plurality of image capturing apparatuses.

When the user terminal 82a can be carried by the user, the user terminal 82a is not necessarily always carried by the particular user 80a. Therefore, the storage controlling unit 240 may delete the attribute information depending on time elapsed since the time included in the attribute information. For example, the storage controlling unit 240 deletes the attribute information when a predetermined time has elapsed since the time included in the attribute information. As an example, the storage controlling unit 240 deletes the attribute information when 24 hours or more have elapsed since the time included in the attribute information.

Figure 5:
FIG. 5 schematically illustrates a situation where the assistance controlling unit 260 assists a traffic participant.
Figure 5:
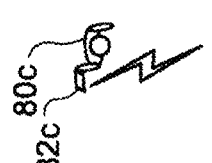
Figure 5:
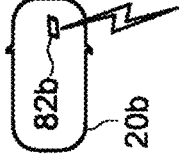
Figure 5:
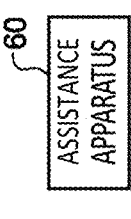

FIG. 5 schematically illustrates a situation where the assistance controlling unit 260 assists a traffic participant. Here, it is assumed that the attribute information of the vehicle 20b is already stored in the storage device 280. That is, it is assumed that the recognition information and the traveling characteristic information of the vehicle 20b acquired by the image capturing apparatus 70 and/or the in-vehicle processing apparatus 40a are stored in the storage device 280 in association with the identification information of the user terminal 82b.

The user terminal 82b transmits the location information and the identification information to the assistance apparatus 60. The assistance controlling unit 260 acquires, based on the identification information transmitted from the user terminal 82b, the recognition information and the traveling characteristic information that are stored in association with the identification information in the storage device 280. Thus, the assistance controlling unit 260 determines that a vehicle having the recognition information and the traveling characteristic information exists at the location transmitted from the user terminal 82b.

A user terminal 82c transmits the location information and the identification information to the assistance apparatus 60. The assistance controlling unit 260 performs traffic assistance for the user terminal 82c based on a history of the location information transmitted from the user terminal 82b, a history of the location information transmitted from the user terminal 82c, and the recognition information and the traveling characteristic information that are associated with the identification information of the user terminal 82b.

As an example, as illustrated in FIG. 5, assume a situation where the user terminal 82c is about to cross a road 90. The assistance controlling unit 260 determines that the user 80c is about to cross the road 90 from the histories of the location information of the user terminal 82b and the user terminal 82c and map information and, when it is determined that the user terminal 82b and the user terminal 82c are close to each other within a predetermined distance and when the traveling characteristic information associated with the identification information of the user terminal 82b includes information notifying that it has a tendency to disregard a pedestrian crossing a road, the assistance controlling unit 260 transmits, to the user terminal 82c, assistance information instructing the user terminal 82c to output warning information. The assistance information for the user terminal 82c may be information instructing to vocally output warning information notifying that "Please be aware of the vehicle."

The assistance information for the user terminal 82c may be information instructing to vocally output warning information notifying that "Please be aware of the red vehicle" based on the recognition information. The assistance information for the user terminal 82c may be information instructing to further output warning information notifying that "Please be careful enough when crossing a road" based on the traveling characteristic information associated with the identification information of the user terminal 82b.

In another case, the assistance controlling unit 260 may determine whether the user terminal 82b and the user terminal 82c will come close to each other in a predetermined time, by the assistance controlling unit 260 estimating respective locations of the user terminal 82b and the user terminal 82c when the predetermined time has elapsed. When it is determined that the user terminal 82b and the user terminal 82c will come close to each other in the predetermined time, the assistance controlling unit 260 may transmit, to the user terminal 82c, assistance information instructing the user terminal 82c to vocally output warning information notifying that "Please be aware of the approaching vehicle."

The assistance information may be information instructing to vocally output warning information notifying that "Please be aware of the approaching red vehicle" based on the recognition information. The assistance controlling unit 260 may set the "predetermined time" based on the traveling characteristic information associated with the identification information of the user terminal 82b when determining whether the user terminal 82b and the user terminal 82c will come close to each other in the predetermined time. The assistance controlling unit 260 may set the "predetermined time" to be longer when the traveling characteristic information associated with the identification information of the user terminal 82b indicates that it has a tendency toward unsafe driving.

Figure 6:
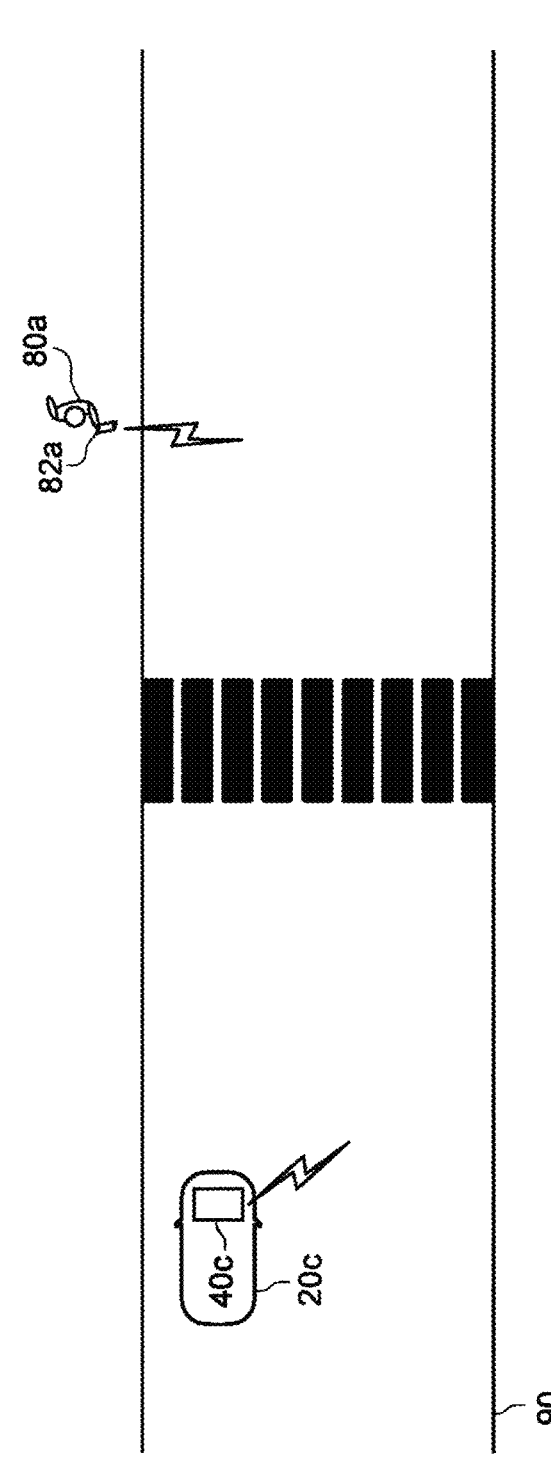
FIG. 6 schematically illustrates another situation where the assistance controlling unit 260 assists a traffic participant.
Figure 6:

FIG. 6 schematically illustrates another situation where the assistance controlling unit 260 assists a traffic participant. Here, it is assumed that the attribute information of the user 80a is already stored in the storage device 280. That is, it is assumed that the recognition information and the traveling characteristic information of the user 80a acquired by the image capturing apparatus 70 and/or the in-vehicle processing apparatus 40a are stored in association with the identification information of the user terminal 82a in the storage device 280.

In the situation illustrated in FIG. 6, traffic participants are the user 80a and a vehicle 20c. The vehicle 20c includes an in-vehicle processing apparatus 40c. The in-vehicle processing apparatus 40c has a feature for communication with the assistance apparatus 60, as in a case of the in-vehicle processing apparatus 40a of the vehicle 20a.

The user terminal 82a transmits the location information and the identification information to the assistance apparatus 60. The assistance controlling unit 260 acquires, based on the identification information transmitted from the user terminal 82a, the recognition information and the walking characteristic information that are stored in association with the identification information in the storage device 280. Thus, the assistance controlling unit 260 determines that a user having the recognition information and the walking characteristic information exists at the location transmitted from the user terminal 82a.

The in-vehicle processing apparatus 40c transmits the location information to the assistance apparatus 60. The assistance controlling unit 260 performs traffic assistance for the user 80a and the vehicle 20c based on a history of the location information transmitted from the in-vehicle processing apparatus 40c, a history of the location information transmitted from the user terminal 82a, and the recognition information and the walking characteristic information that are associated with the identification information of the user terminal 82a.

As an example, as illustrated in FIG. 6, assume a situation where the user terminal 82a exists in a vicinity of a crosswalk. When the assistance controlling unit 260 determines, from the location information of the user terminal 82a and the in-vehicle processing apparatus 40c and map information, that the user terminal 82a is located in the vicinity of the crosswalk and the user terminal 82a and the in-vehicle processing apparatus 40c are close to each other within a predetermined distance, and when the traveling characteristic information associated with the identification information of the user terminal 82a includes information notifying that it has a tendency to cross a road at a location where no crosswalk is provided in a vicinity of a crosswalk, the assistance controlling unit 260 transmits, to the user terminal 82a and the in-vehicle processing apparatus 40c, assistance information instructing the user terminal 82a and the in-vehicle processing apparatus 40c to output warning information.

The assistance information for the user terminal 82a may be information instructing the user terminal 82a to vocally output warning information notifying that "Please be aware of the approaching vehicle."

The assistance information of the user terminal 82a may information instructing the user terminal 82a to vocally output warning information notifying that "There is a crosswalk, so please use the crosswalk." based on the walking characteristic information associated with the identification information of the user terminal 82a.

The assistance information for the in-vehicle processing apparatus 40c may be information instructing the in-vehicle processing apparatus 40c to output, vocally or by a visual indication, warning information notifying that "Please be aware of the pedestrian."

The assistance information for the in-vehicle processing apparatus 40c may be information instructing to output warning information notifying that "Please be aware of the pedestrian dressed in red" based on the recognition information associated with the identification information of the user terminal 82a. The assistance information for the in-vehicle processing apparatus 40c may be information instructing to further output warning information notifying that "Please also be aware of the pedestrian's diagonally crossing the road" based on the walking characteristic information associated with the identification information of the user terminal 82a.

As described in the examples with reference to FIG. 5 and FIG. 6 and the like, appropriate assistance can be provided to a traffic participant, depending on the recognition information and the traveling characteristic information of the vehicle 20b associated with the user terminal 82b, or the recognition information and the walking characteristic of the user 80a associated with the user terminal 82a.

Figure 7:
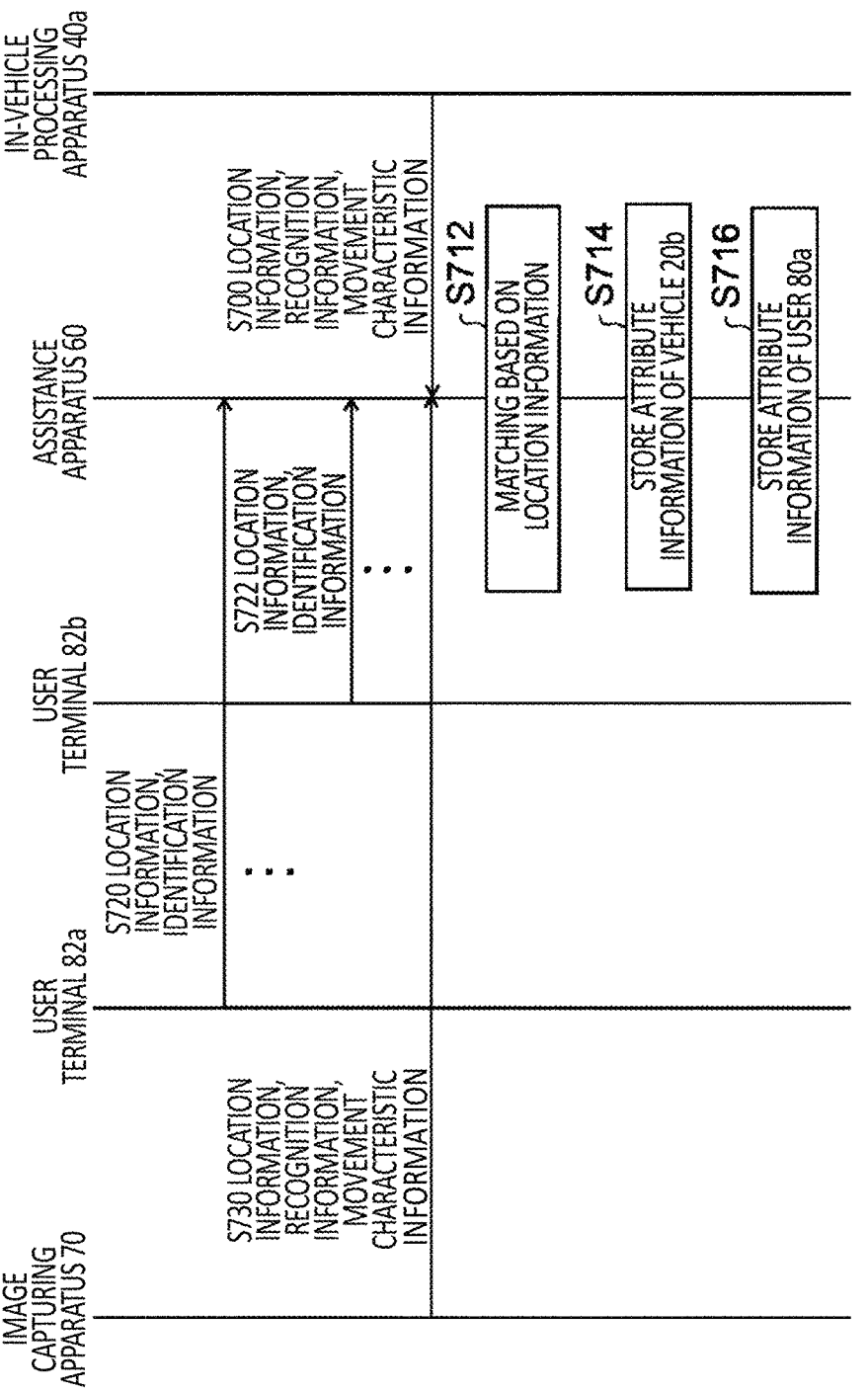
FIG. 7 illustrates an example of an execution sequence of a process related to an assistance controlling method implemented in an image capturing apparatus 70, a user terminal 82, an in-vehicle processing apparatus 40a equipped in a vehicle 20a, and the assistance apparatus 60.

FIG. 7 illustrates an example of an execution sequence of a process related to an assistance controlling method implemented in the image capturing apparatus 70, the user terminal 82, the in-vehicle processing apparatus 40a equipped in the vehicle 20a, and the assistance apparatus 60.

In S720, the user terminal 82a transmits location information indicating a current location of the user terminal 82a based on a signal received from a GNSS satellite to the assistance apparatus 60 together with identification information of the user terminal 82a. The user terminal 82a periodically transmits the location information and the identification information to the assistance apparatus 60.

In S722, the user terminal 82b transmits location information indicating a current location of the user terminal 82b based on a signal received from the GNSS satellite to the assistance apparatus 60 together with identification information of the user terminal 82b. The user terminal 82b periodically transmits the location information and the identification information to the assistance apparatus 60.

In S700, the in-vehicle processing apparatus 40a transmits, to the assistance apparatus 60, location information, recognition information, and walking characteristic information of the user 80a, and/or location information, recognition information, and traveling characteristic information of the vehicle 20b, which are obtained by analyzing an image captured by the image capturing apparatus equipped in the in-vehicle processing apparatus 40a.

In S730, the image capturing apparatus 70 transmits, to the assistance apparatus 60, location information, recognition information, and walking characteristic information of the user 80a, and/or location information, recognition information, and traveling characteristic information of the vehicle 20b, which are obtained by analyzing an image captured by the image capturing apparatus 70.

In S712, the assistance controlling unit 260 of the assistance apparatus 60 performs matching based on a similarity of locations and displacements based on histories of location information received from the user terminal 82, the image capturing apparatus 70, and the in-vehicle processing apparatus 40a in S720, S722, S700, and S730. Thus, the assistance controlling unit 260 determines that the location information of the user terminal 82a and the location information of the user 80a that are transmitted from the image capturing apparatus 70 and/or the in-vehicle processing apparatus 40a match, and further determines that the location information of the user terminal 82b and the location information of the vehicle 20b that are transmitted from the image capturing apparatus 70 and/or the in-vehicle processing apparatus 40a match.

In S714, the storage controlling unit 240 controls attribute information based on the identification information of the user terminal 82b and the recognition information and the traveling characteristic information of the vehicle 20*b* that are transmitted from the image capturing apparatus 70 and/or the in-vehicle processing apparatus 40*a* to be stored in the storage device 280.

In S716, the storage controlling unit 240 controls attribute information based on the identification information of the user terminal 82*a* and the recognition information and the traveling characteristic information of the user 80*a* that are transmitted from the image capturing apparatus 70 and/or the in-vehicle processing apparatus 40*a* to be stored in the storage device 280.

Figure 8:
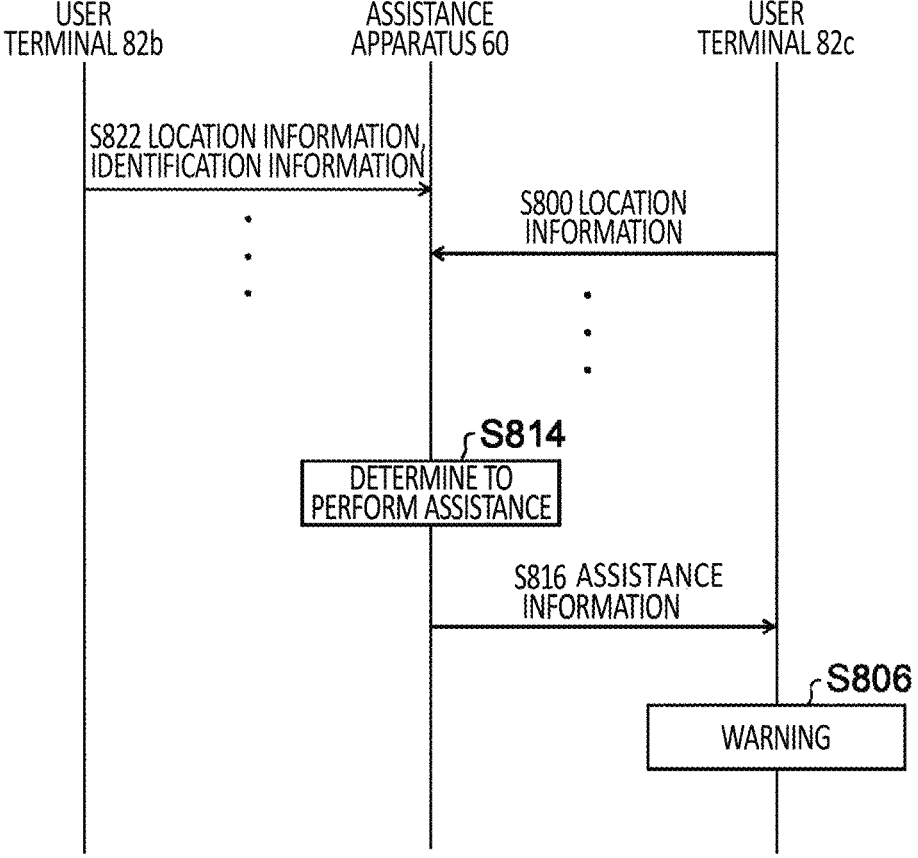
FIG. 8 illustrates an example of an execution sequence of a process related to an assistance controlling method implemented in a user terminal 82b, the assistance apparatus 60, and a user terminal 82c.

FIG. 8 illustrates an example of an execution sequence of a process related to an assistance controlling method implemented in the user terminal 82*b*, the assistance apparatus 60, and the user terminal 82*c*. FIG. 8 particularly illustrates an example of an execution sequence when performing traffic assistance for the user terminal 82*c*.

In S822, the user terminal 82*b* transmits location information indicating a current location of the user terminal 82*b* based on a signal received from a GNSS satellite to the assistance apparatus 60 together with identification information of the user terminal 82*b*. The user terminal 82*b* periodically transmits the location information and the identification information to the assistance apparatus 60.

In S800, the user terminal 82*c* transmits location information indicating a current location of the user terminal 82*c* based on a signal received from the GNSS satellite to the assistance apparatus 60. The user terminal 82*c* periodically transmits the location information to the assistance apparatus 60.

In S814, the assistance controlling unit 260 of the assistance apparatus 60 determines whether to perform the assistance based on the information transmitted from the user terminal 82*a* and the user terminal 82*c*. For example, as described with reference to FIG. 5 and the like, when it is determined, from a history of the location information of the user terminal 82*c* and map information, that the user terminal 82*c* is about to cross the road 90, and it is determined, from histories of the location information of the user terminal 82*b* and the user terminal 82*c*, that the user terminal 82*b* and the user terminal 82*c* are close to each other within a predetermined distance, the assistance controlling unit 260 determines to perform the assistance for the user terminal 82*c*. As described with reference to FIG. 5 and the like, the assistance controlling unit 260 may determine whether to perform the assistance, based on the traveling characteristic information stored in the storage device 280 in association with the identification information of the user terminal 82*b*.

When it is determined to perform the assistance, the assistance controlling unit 260 transmits the assistance information to the user terminal 82*c* through the communication apparatus 290 in S816. As described with reference to FIG. 5 and the like, the assistance information may be information instructing the user terminal 82*c* to output warning information. As described with reference to FIG. 5 and the like, the assistance information may be information based on the recognition information and/or the traveling characteristic information stored in the storage device 280 in association with the identification information of the user terminal 82*b*.

When it receives the assistance information from the assistance apparatus 60, the user terminal 82*c* outputs the warning information based on the assistance information by an HMI (Human Machine Interface) feature of the user terminal 82*c* in S806. The user terminal 82*c* may vocally output warning information.

Figure 9:
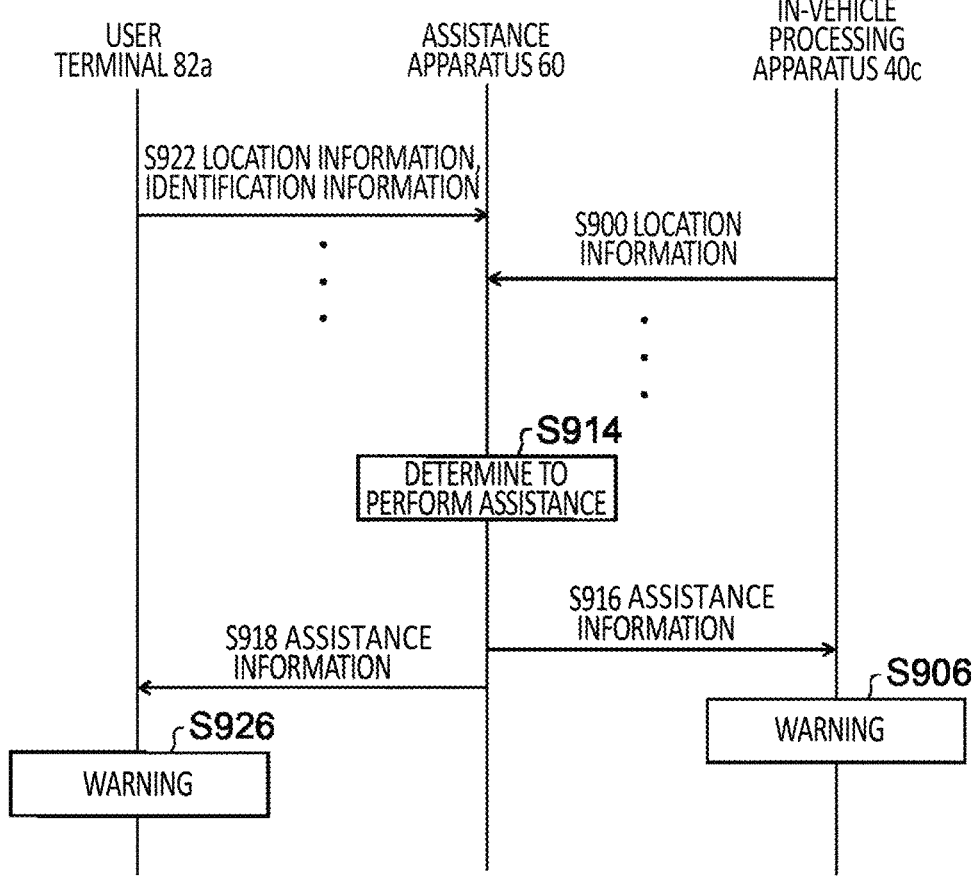
FIG. 9 illustrates an example of an execution sequence of a process related to an assistance controlling method implemented in a user terminal 82a, the assistance apparatus 60, and an in-vehicle processing apparatus 40c equipped in a vehicle 20c.

FIG. 9 illustrates an example of an execution sequence of a process related to an assistance controlling method implemented in the user terminal 82*a*, the assistance apparatus 60, and the in-vehicle processing apparatus 40*c* equipped in the vehicle 20*c*. FIG. 9 particularly illustrates an example of an execution sequence when performing traffic assistance for the in-vehicle processing apparatus 40*c* and the user terminal 82*a*.

In S922, the user terminal 82*a* transmits location information indicating a current location of the user terminal 82*a* based on a signal received from a GNSS satellite to the assistance apparatus 60 together with identification information of the user terminal 82*a*. The user terminal 82*a* periodically transmits the location information and the identification information to the assistance apparatus 60.

In S900, the in-vehicle processing apparatus 40*c* transmits location information indicating a current location of the vehicle 20*c* based on a signal received from the GNSS satellite to the assistance apparatus 60. The in-vehicle processing apparatus 40*c* periodically transmits the location information to the assistance apparatus 60.

In S914, the assistance controlling unit 260 of the assistance apparatus 60 determines whether to perform to the assistance for the in-vehicle processing apparatus 40*c* and/or the user terminal 82*a* based on the information transmitted from the user terminal 82*a* and the in-vehicle processing apparatus 40*c*. For example, as described with reference to FIG. 6 and the like, when it is determined, from the location information of the user terminal 82*a* and map information, that the user terminal 82*a* is located in a vicinity of a crosswalk and, from histories of the location information of the in-vehicle processing apparatus 40*c* and the user terminal 82*a*, that the user terminal 82*a* and the in-vehicle processing apparatus 40*c* are close to each other within a predetermined distance, the assistance controlling unit 260 determines to perform the assistance for the user 80*a* of the user terminal 82*a* and the vehicle 20*c*. As described with reference to FIG. 6 and the like, the assistance controlling unit 260 may determine whether to perform assistance, based on the walking characteristic information stored in association with the identification information of the user terminal 82*a* in the storage device 280.

When it is determined to perform the assistance, the assistance controlling unit 260 transmits the assistance information to the in-vehicle processing apparatus 40*c* through the communication apparatus 290 in S916 and transmits the assistance information to the user terminal 82*a* through the communication apparatus 290 in S918. As described with reference to FIG. 6 and the like, the assistance information may be information instructing the in-vehicle processing apparatus 40*c* and the user terminal 82*c* to output warning information. As described with reference to FIG. 6 and the like, the assistance information may be information based on the recognition information and/or the traveling characteristic information stored in association with the identification information of the user terminal 82*a* in the storage device 280. When it receives the assistance information from the assistance apparatus 60, the in-vehicle processing apparatus 40*c* outputs the warning information based on the assistance information by an HMI feature of the in-vehicle processing apparatus 40*c* in S906. When it receives the assistance information from the assistance apparatus 60, the user terminal 82*a* outputs the warning information based on the assistance information by an HMI feature of the user terminal 82*a* in S926.

According to the assistance system 10 as described above, recognition information and/or walking characteristic information of a pedestrian acquired by an image capturing apparatus on a vehicle and/or a transportation infrastructure having an image capturing feature and a communication feature can be held in association with identification information of a user terminal carried by the pedestrian. Thus, even at a location where the image capturing apparatus on the vehicle and/or the transportation infrastructure having the image capturing feature does not exist in surroundings of the user terminal, by identifying recognition information and/or walking characteristic information of a user carrying the user terminal based on the identification information of the user terminal carried by the pedestrian, appropriate and effective assistance can be provided to a traffic participant based on the identified recognition information and/or walking characteristic information. Further, recognition information and/or traveling characteristic information of a vehicle acquired by an image capturing apparatus on a vehicle and/or a transportation infrastructure having an image capturing feature and a communication feature can be held in association with identification information of a user terminal moving with the vehicle. Thus, even at a location where the image capturing apparatus on the vehicle and/or the transportation infrastructure having the image capturing feature does not exist in surroundings of the vehicle, by identifying recognition information and/or traveling characteristic information of the vehicle based on the identification information of the user terminal located in the vehicle, appropriate and effective traffic assistance can be provided to a traffic participant based on the identified recognition information and/or traveling characteristic information.

Figure 10:
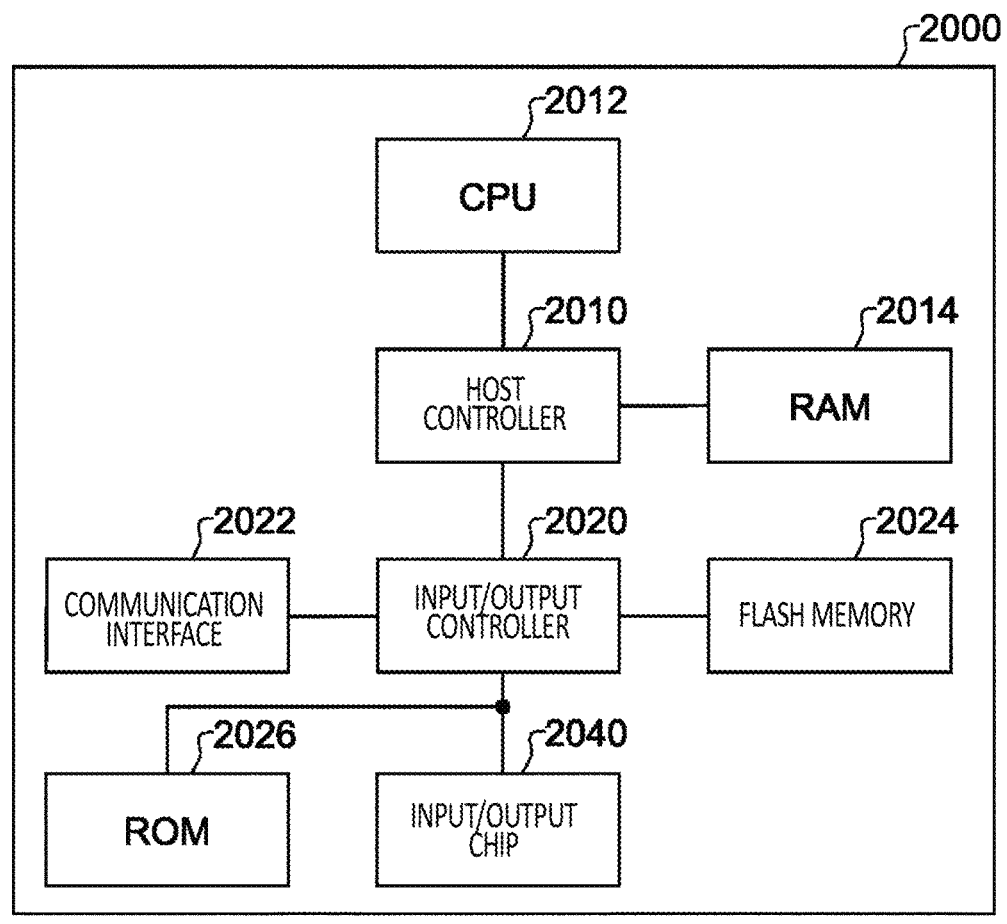
FIG. 10 illustrates an example of a computer 2000.

FIG. 10 illustrates an example of a computer 2000 in which a plurality of embodiments of the present invention may be entirely or partially embodied. A program installed in the computer 2000 can cause the computer 2000 to function as an apparatus such as the assistance apparatus 60 according to the embodiments or each unit of the apparatus, to perform an operation associated with the apparatus or each unit of the apparatus, and/or to perform a process or a stage of the process according to the embodiments. Such a program may be executed by a CPU 2012 in order to cause the computer 2000 to execute a particular operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to a program stored in the ROM 2026 and the RAM 2014 and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

The programs are provided via a network or a computer-readable storage medium such as a CD-ROM, a DVD-ROM, or a memory card. The RAM 2014, the ROM 2026, or the flash memory 2024 is an example of the computer-readable storage medium. The programs are installed in the flash memory 2024, the RAM 2014, or the ROM 2026, and executed by the CPU 2012. Information processing written in these programs is read by the computer 2000 and provides cooperation between the programs and the various types of hardware resources described above. An apparatus or a method may be composed by implementing operations or processing of information using the computer 2000.

For example, when the computer 2000 and an external device communicate with each other, the CPU 2012 may execute a communication program loaded in the RAM 2014, and instruct the communication interface 2022 to execute a communication process based on a process written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various types of processing on the data on the RAM 2014. Next, the CPU 2012 writes back the processed data into the recording medium.

Various types of information such as various types of programs, data, a table, and a database may be stored in the recording medium and subjected to information processing. The CPU 2012 may execute, on the data read from the RAM 2014, various types of processing including various types of operations, information processing, conditional judgement, conditional branching, unconditional branching, information retrieval/replacement, or the like described herein and designated by instruction sequences of the programs, and write back a result into the RAM 2014. In addition, the CPU 2012 may retrieve information in a file, a database, or the like in the recording medium. For example, when a plurality of entries each having an attribute value of a first attribute associated with an attribute value of a second attribute are stored in the recording medium, the CPU 2012 may retrieve an entry having a designated attribute value of the first attribute that matches a condition from among the plurality of entries, and read the attribute value of the second attribute stored in the entry, thereby acquiring the attribute value of the second attribute associated with the first attribute that satisfies a predetermined condition.

The programs or software modules described above may be stored in the computer-readable storage medium on the computer 2000 or in a vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

Programs that are installed in the computer 2000 and cause the computer 2000 to function as the assistance apparatus 60 may act on the CPU 2012 or the like to cause the computer 2000 to function as each unit (for example, the assistance controlling apparatus 200 or the like) of the assistance apparatus 60. When read by the computer 2000, information processings written in these programs function to implement each unit of the assistance apparatus 60 as specific means where software and various hardware resources as described above cooperate. These specific means implement operations or processings of information depending on the intended use of the computer 2000 in the present embodiment, and thereby the assistance apparatus 60 proper for the intended use is constructed.

Various embodiments have been described with reference to the block diagrams and the like. In the block diagrams, each block may represent (1) a stage of a process in which an operation is executed, or (2) each unit of the apparatus having a role in executing the operation. A particular stage and each unit may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element such as a flip-flop, a register, a field programmable gate array (FPGA), a programmable logic array (PLA), or the like.

The computer-readable storage medium may include any tangible device capable of storing instructions to be executed by an appropriate device and thereby the computer-readable storage medium having instructions stored therein constitutes at least a part of a product including instructions which can be executed to provide means for executing processing procedures or operations designated in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, and the like.

The computer-readable instructions may include an assembler instruction, an instruction-set-architecture (ISA) instruction, a machine instruction, a machine dependent instruction, a microcode, a firmware instruction, state-setting data, or either of source code or object code written in any combination of one or more programming languages including an object oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing apparatus, or to programmable circuit, locally or via a local area network (LAN), a wide area network (WAN) such as the Internet, and a computer-readable instruction may be executed to provide means for executing operations designated in the described processing procedures or block diagrams. Examples of the processor include a computer processor, a processing unit, a microprocessor, a digital signal processor, a controller, a microcontroller, and the like.

While the present invention has been described by way of the embodiments, the technical scope of the present invention is not limited to the scope described in the above-described embodiments. It is apparent to persons skilled in the art that various modifications or improvements can be made to the above-described embodiments. It is also apparent from description of the claims that the embodiments to which such modifications or improvements are made may be included in the technical scope of the present invention.

The operations, procedures, steps, and stages etc. of each process performed by the apparatus, the system, the program, and the method shown in the claims, specification, or drawings can be implemented in any order as long as the order is not indicated by "before", "prior to", or the like and as long as the output from a previous process is not used in a later process. Even if the operation flow is described using phrases such as "first" or "next" for the sake of convenience in the claims, specification, or drawings, it does not necessarily mean that the process must be performed in this order.

EXPLANATION OF REFERENCES

10: assistance system
20: vehicle
40: in-vehicle processing apparatus
50: traffic light
60: assistance apparatus
70: image capturing apparatus
80: user
82: user terminal
90: road
200: assistance controlling apparatus
202: acquiring unit
210: first acquiring unit
220: second acquiring unit
240: storage controlling unit
260: assistance controlling unit
280: storage device
290: communication apparatus
2000: computer
2010: host controller
2012: CPU
2014: RAM
2020: input/output controller
2022: communication interface
2024: flash memory
2026: ROM
2040: input/output chip.

What is claimed is:

1. An assistance controlling apparatus comprising:
a first acquiring unit which acquires identification information and location information of a user terminal associated with a user;
a second acquiring unit which acquires recognition information and location information of a moving object acquired by analyzing an image of the moving object acquired by an image capturing apparatus;
a storage controlling unit which performs control for storing the recognition information of the moving object acquired by the second acquiring unit in association with the identification information of the user terminal acquired by the first acquiring unit when the location information of the user terminal acquired by the first acquiring unit and the location information of the moving object acquired by the second acquiring unit match; and an assistance controlling unit which performs control related to assistance for a traffic participant based on the identification information of the user terminal and the recognition information of the moving object that are stored in association with each other under the control of the storage controlling unit.

2. The assistance controlling apparatus according to claim 1, wherein, even if the second acquiring unit cannot acquire the recognition information of the moving object, when the first acquiring unit acquires the identification information of the user terminal, the assistance controlling unit performs the assistance for the traffic participant based on the identification information of the user terminal and the recognition information of the moving object that are stored in association with each other under the control of the storage controlling unit.

3. The assistance controlling apparatus according to claim 1, wherein the assistance controlling unit performs control for informing the traffic participant other than the user of the recognition information.

4. The assistance controlling apparatus according to claim 1, wherein the recognition information includes information indicating a color of the moving object.

5. The assistance controlling apparatus according to claim 1, wherein the recognition information includes information indicating a type of the moving object.

6. The assistance controlling apparatus according to claim 1, wherein the recognition information includes information indicating a size of the moving object.

7. The assistance controlling apparatus according to claim 1, wherein, each time a predetermined time has elapsed, the storage controlling unit performs control for deleting the identification information of the user terminal and the recognition information of the moving object that are stored in association with each other.

8. The assistance controlling apparatus according to claim 1, wherein, when location information of the user terminal newly acquired by the first acquiring unit and location information of the moving object newly acquired by the second acquiring unit match, the storage controlling unit performs control for updating the identification information of the user terminal and the recognition information of the moving object that are stored in association with each other.

9. The assistance controlling apparatus according to claim 1, wherein the moving object includes at least one of a pedestrian or a vehicle.

10. The assistance controlling apparatus according to claim 1, wherein the second acquiring unit further acquires movement characteristic information of the moving object and the location information of the moving object acquired by analyzing the image of the moving object acquired by the image capturing apparatus, when the location information of the user terminal acquired by the first acquiring unit and the location information of the moving object acquired by the second acquiring unit match, the storage controlling unit performs control for storing the recognition information and the movement characteristic information of the moving object acquired by the second acquiring unit in association with the identification information of the user terminal acquired by the first acquiring unit, and the assistance controlling unit performs control related to the assistance for the traffic participant based on the identification information of the user terminal and the recognition information and the movement characteristic information of the moving object that are stored in association with each other under the control of the storage controlling unit.

11. The assistance controlling apparatus according to claim 10, wherein the moving object includes a pedestrian, the recognition information includes information indicating a color of the pedestrian, and the movement characteristic information includes information indicating a behavior tendency related to passage of a road by the pedestrian.

12. The assistance controlling apparatus according to claim 10, wherein the moving object includes a vehicle, the recognition information includes information indicating a color of the vehicle, and the movement characteristic information includes information related to unsafe driving of the vehicle.

13. The assistance controlling apparatus according to claim 2, wherein the assistance controlling unit performs control for informing the traffic participant other than the user of the recognition information.

14. The assistance controlling apparatus according to claim 2, wherein the recognition information includes information indicating a color of the moving object.

15. The assistance controlling apparatus according to claim 2, wherein the recognition information includes information indicating a type of the moving object.

16. The assistance controlling apparatus according to claim 2, wherein the recognition information includes information indicating a size of the moving object.

17. The assistance controlling apparatus according to claim 2, wherein, each time a predetermined time has elapsed, the storage controlling unit performs control for deleting the identification information of the user terminal and the recognition information of the moving object that are stored in association with each other.

18. The assistance controlling apparatus according to claim 2, wherein, when location information of the user terminal newly acquired by the first acquiring unit and location information of the moving object newly acquired by the second acquiring unit match, the storage controlling unit performs control for updating the identification information of the user terminal and the recognition information of the moving object that are stored in association with each other.

19. An assistance controlling method comprising:

acquiring identification information and location information of a user terminal associated with a user;

acquiring recognition information and location information of a moving object acquired by analyzing an image of the moving object acquired by an image capturing apparatus;

when the location information of the user terminal and the location information of the moving object match, performing control of storing the recognition information of the moving object in association with the identification information of the user terminal; and performing control related to assistance for a traffic participant based on the identification information of the user terminal and the recognition information of the moving object that are stored in association with each other by the performing the control for storing.

20. A non-transitory computer-readable storage medium having stored thereon a program, wherein the program causes a computer to function as:

a first acquiring unit which acquires identification information and location information of a user terminal associated with a user;

a second acquiring unit which acquires recognition information and location information of a moving object acquired by analyzing an image of the moving object acquired by an image capturing apparatus;

a storage controlling unit which performs control for storing the recognition information of the moving object acquired by the second acquiring unit in association with the identification information of the user terminal acquired by the first acquiring unit when the location information of the user terminal acquired by the first acquiring unit and the location information of the moving object acquired by the second acquiring unit match; and an assistance controlling unit which performs control related to assistance for a traffic participant based on the identification information of the user terminal and the recognition information of the moving object that are stored in association with each other under the control of the storage controlling unit.

* * * * *